(12) United States Patent
Zellner et al.

(10) Patent No.: US 7,624,152 B2
(45) Date of Patent: Nov. 24, 2009

(54) METHODS, COMPUTER PROGRAMS, AND APPARATUS FOR PERFORMING FORMAT CONVERSION OF FILES ATTACHED TO ELECTRONIC MESSAGES

(75) Inventors: Samuel Zellner, Dunwoody, GA (US); Wendy Eason, Decatur, GA (US); Jerry Liu, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 609 days.

(21) Appl. No.: 11/298,181

(22) Filed: Dec. 8, 2005

(65) Prior Publication Data

US 2007/0136427 A1  Jun. 14, 2007

(51) Int. Cl.
 *G06F 15/16* (2006.01)
(52) U.S. Cl. .............. 709/206; 709/207; 709/246; 709/247
(58) Field of Classification Search ......... 709/206, 709/207, 246, 247
See application file for complete search history.

(56) References Cited

U.S. PATENT DOCUMENTS

| | | | | |
|---|---|---|---|---|
| 5,647,002 A * | 7/1997 | Brunson | ............. | 709/206 |
| 5,859,967 A * | 1/1999 | Kaufeld et al. | ............ | 726/5 |
| 6,092,114 A * | 7/2000 | Shaffer et al. | ............ | 709/232 |
| 6,253,231 B1 * | 6/2001 | Fujii | ............. | 709/206 |
| 6,598,076 B1 | 7/2003 | Chang et al. | ............ | 709/206 |
| 6,904,455 B1 | 6/2005 | Yen | ............. | 709/217 |
| 7,213,078 B2 * | 5/2007 | Matsuura et al. | ........ | 709/246 |
| 7,444,381 B2 * | 10/2008 | Malik | ............. | 709/206 |
| 2002/0194286 A1 * | 12/2002 | Matsuura et al. | ........ | 709/206 |
| 2003/0018720 A1 | 1/2003 | Chang et al. | ............ | 709/206 |
| 2003/0050933 A1 | 3/2003 | DeSalvo | ............ | 707/102 |
| 2003/0065776 A1 | 4/2003 | Malik et al. | ............ | 709/225 |
| 2003/0065779 A1 | 4/2003 | Malik et al. | ............ | 709/225 |
| 2003/0093565 A1 * | 5/2003 | Berger et al. | ............ | 709/246 |
| 2004/0030982 A1 * | 2/2004 | Aldridge et al. | ............ | 714/776 |
| 2005/0015721 A1 | 1/2005 | Tsai | ............. | 715/513 |
| 2005/0044158 A1 * | 2/2005 | Malik | ............. | 709/206 |
| 2005/0086315 A1 | 4/2005 | Malik et al. | ............ | 709/206 |
| 2005/0135681 A1 * | 6/2005 | Schirmer | ............ | 382/229 |
| 2005/0223073 A1 | 10/2005 | Malik | ............. | 709/206 |

* cited by examiner

*Primary Examiner*—Saleh Najjar
*Assistant Examiner*—Edward J Kim
(74) *Attorney, Agent, or Firm*—Cantor Colburn LLP

(57) ABSTRACT

Methods, computer programs, and apparatus for performing format conversion of a file attached to an electronic message. A message entered by a user is accepted. The user's selection of a file is also accepted, and the file is copied for accompanying the message as a file attachment. The file attachment is in a first file format of a file category. The file attachment is converted from the first file format to a second file format of the file category. The message entered by the user is transmitted, and the transmitted message is accompanied by the converted file attachment in the second file format of the file category.

3 Claims, 16 Drawing Sheets

METHODS, COMPUTER PROGRAMS, AND APPARATUS FOR PERFORMING FORMAT CONVERSION OF FILES ATTACHED TO ELECTRONIC MESSAGES

BACKGROUND

The present invention relates generally to electronic messages, and more particularly, to improved methods, computer programs, and apparatus for performing format conversion of files attached to electronic messages.

Electronic messages, including emails, instant messages, and wireless text messages, are well known in the art. These electronic messages are oftentimes used to convey file attachments from a sending device to a receiving device. Attachments can include any file category, such as data, computer applications, graphics, photographs, images, word processing documents, spreadsheets, and other files. Since any of a plurality of different software programs may be used to generate and edit a particular file category, there are a plurality of different file formats corresponding to each of the aforementioned file categories. For example, spreadsheets can be created using the Lotus 123 format, or any of the competing formats from Excel and Quattro.

The file category and format are identified by a decimal point delimiting character followed by a three-character file extension (denoted as .xxx) appended to the name of the file (i.e., filename.xxx). Word processing documents using the Notepad format are identified with a file extension of .txt, whereas word processing documents using the Microsoft Word format are identified with a file extension of .doc. Photographs and image files may be in any of a variety of formats, such as .jpg, .tif, .pdf, .bmp, or .gif. Illustrative formats for audio files include .wav and .mp3, whereas movie files may be in .mov or .mpg format. A few file formats can be used to represent files from a plurality of different file categories. For example, an Adobe Acrobat file, denoted by the extension .pdf, may represent a word processing document, a graphics file, or an image.

An electronic message with an accompanying attached file is typically sent over a private network (Intranet) or a public communication network (Internet) using a central electronic message server coupled to a storage device. The receiving device then retrieves the electronic message with the attachment. However, in order to "open" the attached file, the receiving device must have access to a software program equipped to process the file format of the attachment. Pursuant to one illustrative example, assume that the attachment is in .doc format. The receiving device can open the attachment if the receiving device is loaded with a copy of Microsoft Word. On the other hand, if the attachment is in .pdf format, but the receiving device does not have access to Adobe Acrobat software (either as a resident program or accessible from a network drive), the recipient is unable to open the attachment. Pursuant to another example, an attachment includes a photographic image in .gif or .bmp format, but there is only one program at the receiving device that is equipped to open images, and this program can only open files that are in .jpg format. By way of further illustration, an attachment includes an audio file in .wav format, but the media player programs on the receiving device are only capable of opening audio files in .mp3 format.

Not infrequently, the sender of an electronic message will send an attached file to a receiving device that does not have access to the necessary software to open the file. The recipient may attempt to open the file with a multiplicity of different programs, all to no avail. Alternatively, one of the recipient's software programs may open the attachment, but the recipient's program differs from the software used by the creator of the file, resulting in an opened attachment that may differ significantly from the original file. In the aforementioned scenarios, the recipient must then email the sender, informing the sender that the attachment cannot be opened properly. The sender then has the option of converting the file into a format that the receiving device is equipped to read, or to use another medium to communicate information contained in the file to the recipient.

The inability to open a file attachment leads to frustration, lost productivity, and wasted time. What is needed is a reliable, consistent technique by which an attached file can be converted into a format that is readable by a receiving device. In this manner, recipients of electronic messages can open file attachments without the frustration of asking the sender to transmit another message that includes the attached file in another format.

BRIEF SUMMARY

Exemplary embodiments include methods for performing format conversion of a file attached to an electronic message. The methods comprise accepting a message entered by a user, and accepting the user's selection of a file to be copied for accompanying the message as a file attachment. The file attachment is in a first file format of a file category. The file attachment is converted from the first file format to a second file format of the file category. The message entered by the user is transmitted, and the transmitted message is accompanied by the converted file attachment in the second file format of the file category.

These methods can also be viewed as providing computer program products for establishing a trusted network. The computer program products include a storage medium readable by a processing circuit and storing instructions for execution by the processing circuit for facilitating a method. The facilitated method includes accepting a message entered by a user, and accepting the user's selection of a file to be copied for accompanying the message as a file attachment. The file attachment is in a first file format of a file category. The file attachment is converted from the first file format to a second file format of the file category. The message entered by the user is transmitted. The transmitted message is accompanied by the converted file attachment in the second file format of the file category.

Other exemplary embodiments include an apparatus for performing format conversion of a file attached to an electronic message. The apparatus includes a memory for storing at least one file in a first file format of a file category, and an input mechanism capable of accepting a message entered by a user. The input mechanism is also capable of accepting the user's selection of a file to be copied from memory for accompanying the message as a file attachment. The file attachment is in a first file format of a file category. The apparatus also includes a processing mechanism and a communication mechanism. The processing mechanism converts the file attachment from the first file format to a second file format of the file category. The communication mechanism transmits the message entered by the user over a communication network. The transmitted message is accompanied by the converted file attachment in the second file format of the file category.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains exemplary embodiments of the invention, together with advantages and features, by way of example with reference to the drawings.

DETAILED DESCRIPTION OF EXEMPLARY EMBODIMENTS

Figure 1:
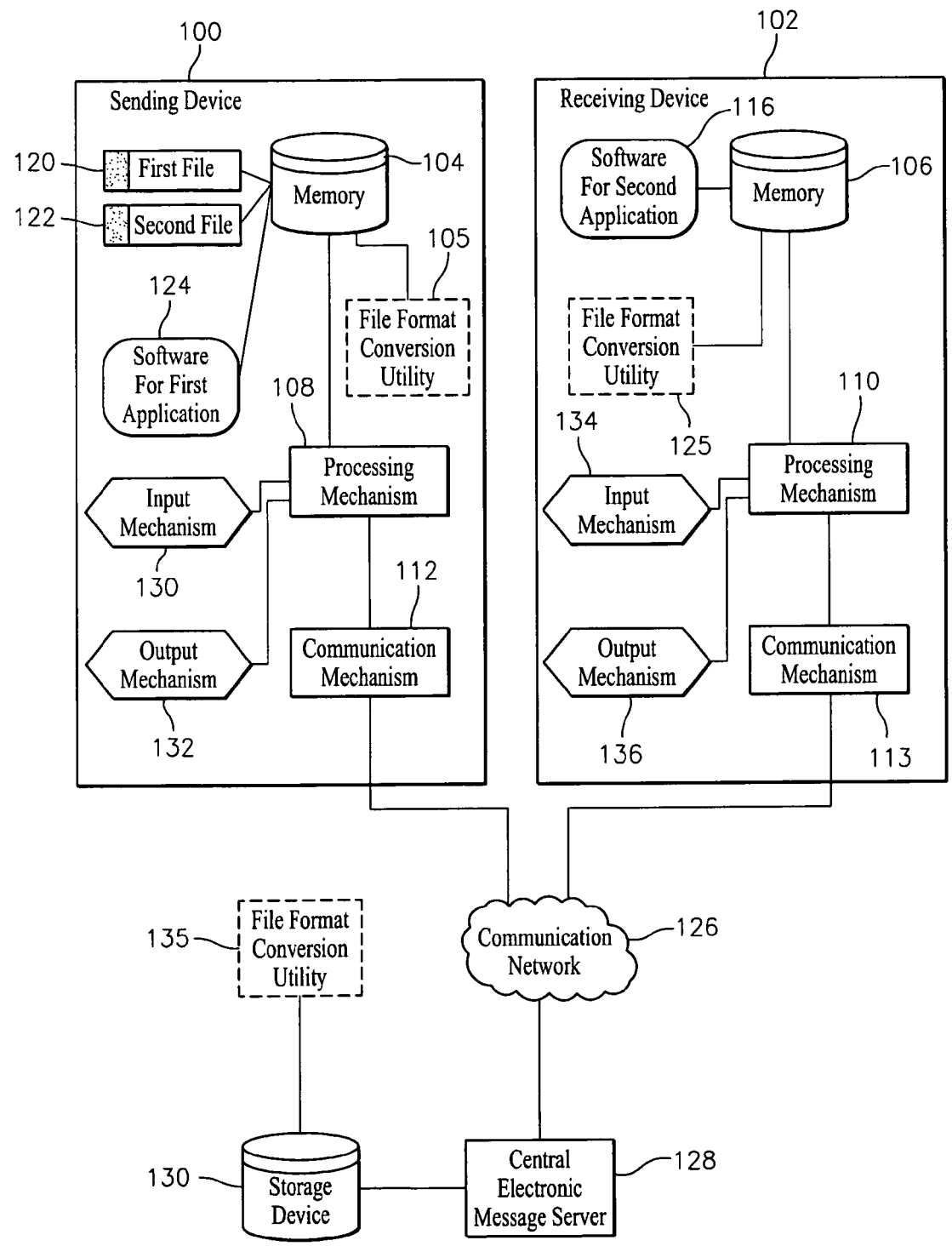
FIG. 1 is a block diagram showing an overall operational environment for various illustrative embodiments.

FIG. 1 is a block diagram showing an overall operational environment for various illustrative embodiments. Illustratively, communication network 126 may represent the Internet, a public switched telephone network (PSTN), a wireless network, or a private communication network such as an Intranet. Communication network 126 enables communication between two or more computing devices, such as a sending device 100 and a receiving device 102. Sending device 100 and receiving device 102 can communicate with one another via electronic messages having files attached thereto. These devices are referred to as sending device 100 and receiving device 102 for explanatory purposes, it being clearly understood that sending device 100 may, but need not, be capable of receiving electronic messages with one or more files attached thereto. Likewise, receiving device 102 may, but need not, be capable of sending electronic messages with one or more files attached thereto. Electronic messages include, but are not limited to, email messages, instant messages, text messages, and messages sent using short messaging service (SMS).

Sending device 100 and receiving device 102 may each be implemented using a personal computer (PC), laptop computer, wireless personal digital assistant (PDA), wireless telephone, or any other type of device that includes a processing mechanism 108, an input mechanism 130, an output mechanism 132, a communication mechanism 112, and memory 104. Sending device 100 and receiving device 102 could, but need not, be selected from the same device category, such that both devices are implemented using, say, personal computers. Receiving device 102 includes a processing mechanism 110, an input mechanism 134, an output mechanism 136, a communication mechanism 113, and memory 106.

Input mechanisms 130, 134 each represent any physical structure capable of converting a user input into an electrical, mechanical, or electromagnetic output. Suitable structures include, but are not limited to, keyboards, keypads, switches, microphones, speech recognition and processing circuitry, touch screens, heat sensors, and optical sensors. Output mechanisms 132, 136 each represent any physical structure capable of converting an electrical signal into a humanly discernable output. Suitable structures include display screens, light emitting diodes, indicator lamps, liquid crystal displays, cathode ray tube displays, plasma screens, loudspeakers, speech synthesizers, and audio annunciators. Processing mechanisms 108, 110 are each implemented using any processing device, such as a microprocessor, microcontroller, logic circuitry, or mainframe computer. Communication mechanisms 112, 113 each represent any mechanism for enabling, respectively, sending device 100 and receiving device 102, to communicate over communication network 126. Memories 104, 106 may be implemented using any computer readable data storage medium, such as semiconductor memory, magnetic tape, bubble memory, disk drives, optical drives, or various combinations thereof.

By way of example, memory 104 contains a first file 120, a second file 122, and software for a first application 124. First file 120 may represent, for example, a word processing document in Microsoft Word format, denoted as filename.doc. Second file 122 may represent a word processing document that is substantially similar to that of first file 120, but in Adobe Acrobat format, denoted as filename.pdf. Software for a first application 124 may represent, for example, Adobe Acrobat software capable of opening second file 122. Optionally, memory 104 includes a file format conversion utility 105 for converting a file having a first file format in a given file category to a file having a second file format in the given file category. As stated above, illustrative file categories include data, computer applications, graphics, photographs, images, word processing documents, and spreadsheets. In the file category of photographs, some exemplary file formats include .jpg, .tiff, and .bmp. Memory 106 optionally includes a file format conversion utility 125 for converting a file having a first file format in a given file category to a file having a second file format in the given file category. For example, file format conversion utility 105 or 125 may include software for converting files in the file category of word processing documents. This software could, by way of illustration, enable word processing documents in Adobe Acrobat .pdf format to be converted into word processing documents that are in Microsoft Word .doc format.

Electronic messages are routed through communication network 126 via a central electronic message server 128. Central electronic message server may be implemented using one or more computer servers. Storage device 130 is capable of storing one or more electronic messages that are to be sent, for example, from sending device 100 to receiving device 102. Storage device 130 may be implemented using any computer readable data storage medium, such as semiconductor memory, magnetic tape, bubble memory, disk drives, optical drives, or various combinations thereof. Optionally, storage device 130 includes a file format conversion utility 135 for converting a file having a first file format in a given file category to a file having a second file format in the given file category.

Although file format conversion utilities 105, 125, and 135 are described as being optional, there is nonetheless a requirement that the operational environment of FIG. 1 should include at least one file format conversion utility 105, 125, or 135. File format conversion utilities 105, 125, and/or 135 may be implemented using any of a variety of software packages or program modules. Illustrative examples of suitable software packages that contain modules for performing file format conversion include, but are not limited to, the following programs. Adobe Acrobat, available from Adobe Systems Incorporated of San Jose, Calif., is equipped to convert Word documents into .pdf format. Able2Doc converts .pdf data into editable Word documents, and Able2Extract converts .pdf data into fully-formatted Excel spreadsheets and editable Word documents. Able2Doc and Able2Extract are available from Investintech.com of Toronto, Ontario, Canada. VirtualDub and FlashKMPG are each capable of converting video MPEG-1 files (.mpg) into .avi files. VirtualDub and FlashKMPG are available for free public download under the open source software GNU General Public License (GPL) at, respectively, www.virtualdub.org, and http://flaskmpeg.sourceforge.net. The Panasonic Stand-Alone MPEG-1 Encoder The Panasonic Stand-Alone MPEG-1 Encoder, available from the Matsushita Electric Corporation of Secaucus, N.J., converts .avi files to MPEG-1 files.

Intel has released a free file conversion utility for Windows called "SmartVid" to convert between AVI and QuickTime (Macintosh) format by relocating file header information. Since the AVI and QuickTime file formats are basically control information wrapped around audio and video data, files are converted by stripping off control information in a first format, and then pasting on the same control information in a second format. SmartVid converts video files regardless of the codec used to compress them; it simply copies the data streams without attempting to decompress the video. A similar program, "TRMOOV", is available from the San Francisco Canyon Company of San Francisco, Calif., and can be downloaded from various sites on the Web.

Microsoft's Paint program is capable of converting image files in any of .bmp, .jpg, or .gif format to an image file in any of .bmp, .dib, or .gif format. Another image editing program, known as ThumbsPlus, converts a file in any of .tiff, .psd, .dcr, .dcs, .png, or .raw format to a file in any of .png, .tiff, or .jpg format. ThumbsPlus is available from Cerious Software Inc. of Charlotte, N.C. In the audio editing domain, GoldWave is equipped to convert audio files to and from any of .wav, .wma, .mp3, .ogg, .aiff, .au, .vox, or raw binary data. GoldWave is available from GoldWave Inc. of St. John's, Newfoundland, Canada. dBPowerAmp is an audio editing program adapted to convert files to and from any of .mp3, .mp4, .m4a, .wma, .ogg, .aac, Monkeys Audio, .flac, or .alac formats. dBPowerAmp can be downloaded from the Web at http://www.dbpoweramp.com/dmc.htm.

Any one or more of the foregoing programs could, but need not, be used to implement any of file format conversion utilities 105, 125, and/or 135. If one or more of these programs are used, program modules exist, or can be modified or written, so that the conversion utility may be integrated with Outlook or another email program. Such integration functions in much the same way as when the full (i.e., read/write) version of Adobe Acrobat is installed on a computing device. Upon installation, Adobe integrates itself with Word, providing a plug-in or a Word menu item that enables users to convert a file from Word .doc format to .pdf format.

Figure 2:
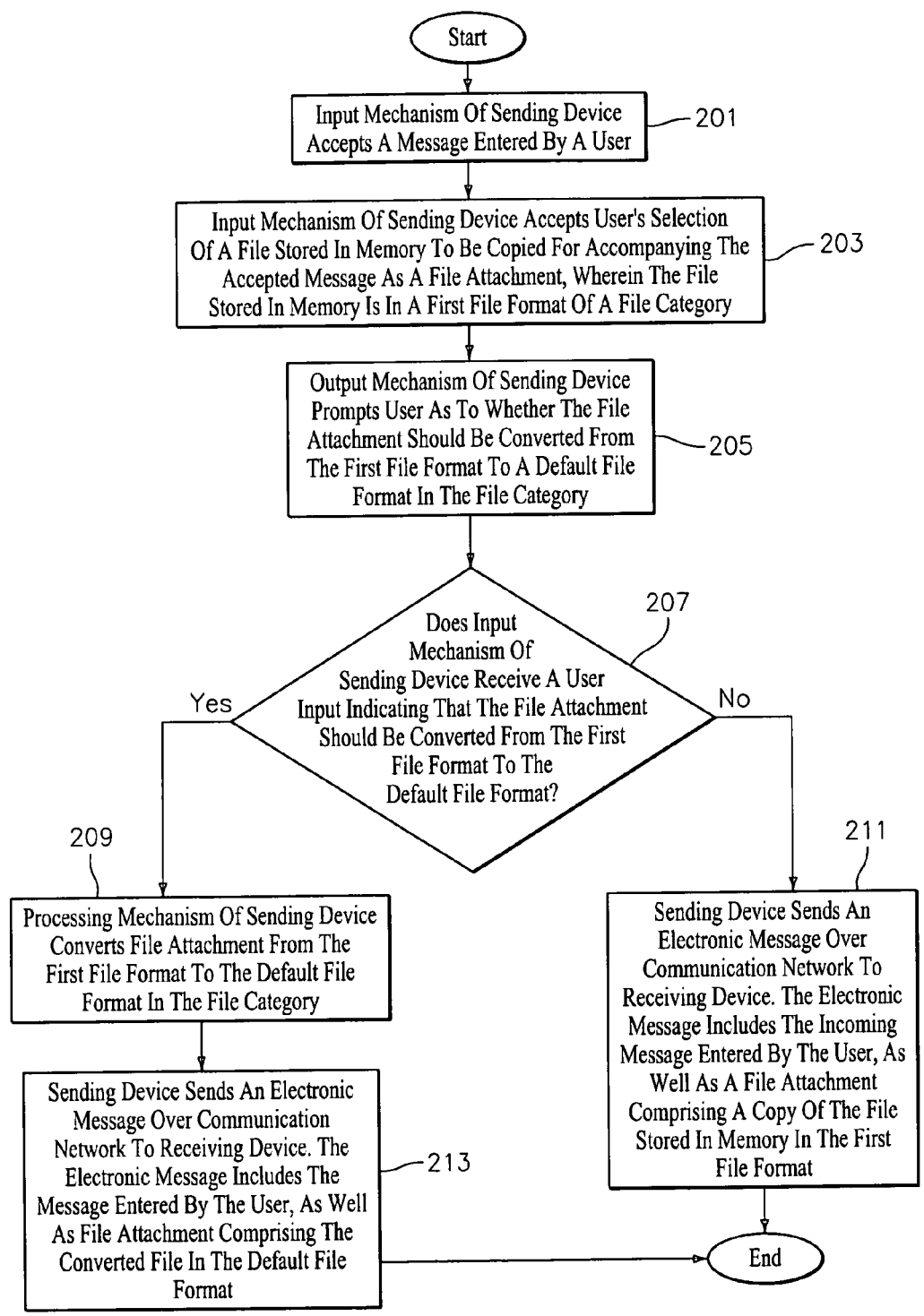
FIG. 2 is a flowchart depicting methods for converting a file attachment from a first file format to a default file format in response to user input at a sending device according to various illustrative embodiments.

FIG. 2 is a flowchart depicting methods for converting a file attachment from a first file format to a default file format in response to user input at a sending device according to various illustrative embodiments. The procedure of FIG. 2 commences at block 201 where input mechanism 130 (FIG. 1) of sending device 100 accepts a message entered by a user. At block 203 (FIG. 2) the input mechanism of the sending device accepts the user's selection of a file (i.e., first file 120, FIG. 1) stored in memory 104 to be copied for accompanying the accepted message as a file attachment. The file stored in memory is in a first file format of a file category. Continuing to block 205 (FIG. 2), output mechanism 132 (FIG. 1) of the sending device prompts the user as to whether the file attachment should be converted from the first file format to a default file format in the file category. This default file format may be specified, for example, at sending device 100, receiving device 102, or at central electronic message server 128, prior to execution of the method of FIG. 2. For instance, Microsoft Word .doc files could be specified as a default file format for word processing documents.

At block 207 (FIG. 2), a test is performed to determine whether or not the input mechanism of the sending device receives a user input indicating that the file attachment should be converted from the first file format to the default file format. If so, the program advances to block 209 where processing mechanism 108 (FIG. 1) of the sending device converts the file attachment from the first file format to the default file format in the file category. At block 213 (FIG. 2), the sending device sends an electronic message over communication network 126 (FIG. 1) to receiving device 102. The electronic message includes the message entered by the user, as well as a file attachment comprising the converted file in the default file format. The negative branch from block 207 leads to block 211 where the sending device sends an electronic message over the communication network to the receiving device. The electronic message includes the incoming message entered by the user, as well as a file attachment comprising a copy of the file stored in memory in the first file format.

Figure 3:
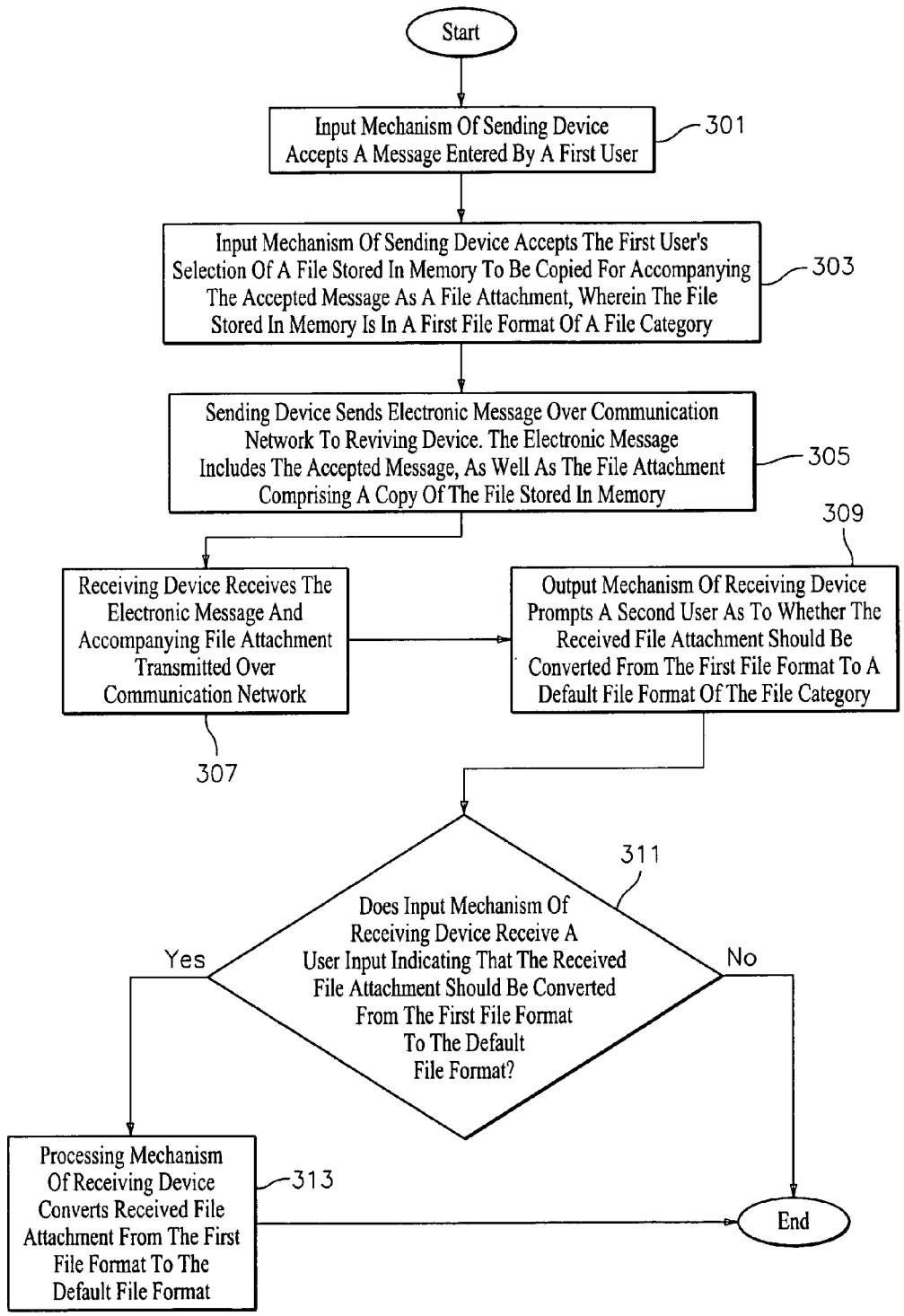
FIG. 3 is a flowchart depicting methods for converting a file attachment from a first file format to a default file format in response to user input at a receiving device according to various illustrative embodiments of the invention.

FIG. 3 is a flowchart depicting methods for converting a file attachment from a first file format to a default file format in response to user input at a receiving device according to various illustrative embodiments. The input mechanism of the sending device accepts a message entered by a first user (block 301, FIG. 3). The input mechanism of the sending device also accepts the first user's selection of a file stored in memory to be copied for accompanying the accepted message as a file attachment. The file stored in memory is in a first file format of a file category (block 303). As an illustrative example, the first file format could be a .jpg format where the file category is photographs. Next (block 305), the sending device sends an electronic message over the communication network to the receiving device. The electronic message includes the accepted message, as well as a file attachment comprising a copy of the file stored in memory in the first file format of the file category.

The receiving device receives the electronic message and accompanying file attachment transmitted over the communication network (block 307). The output mechanism of the receiving device prompts a second user as to whether the received file attachment should be converted from the first file format to a default file format of the file category (block 309). At block 311, a test is performed as to whether or not the input mechanism of the receiving device receives a user input indicating that the received file attachment should be converted from the first file format to the default file format. If so, the processing mechanism of the receiving device converts the received file attachment from the first file format to the default file format (block 313). With respect to the negative branch from block 311, the procedure terminates if the input mechanism does not receive a user input indicating that the received file attachment should be converted.

Figure 4:
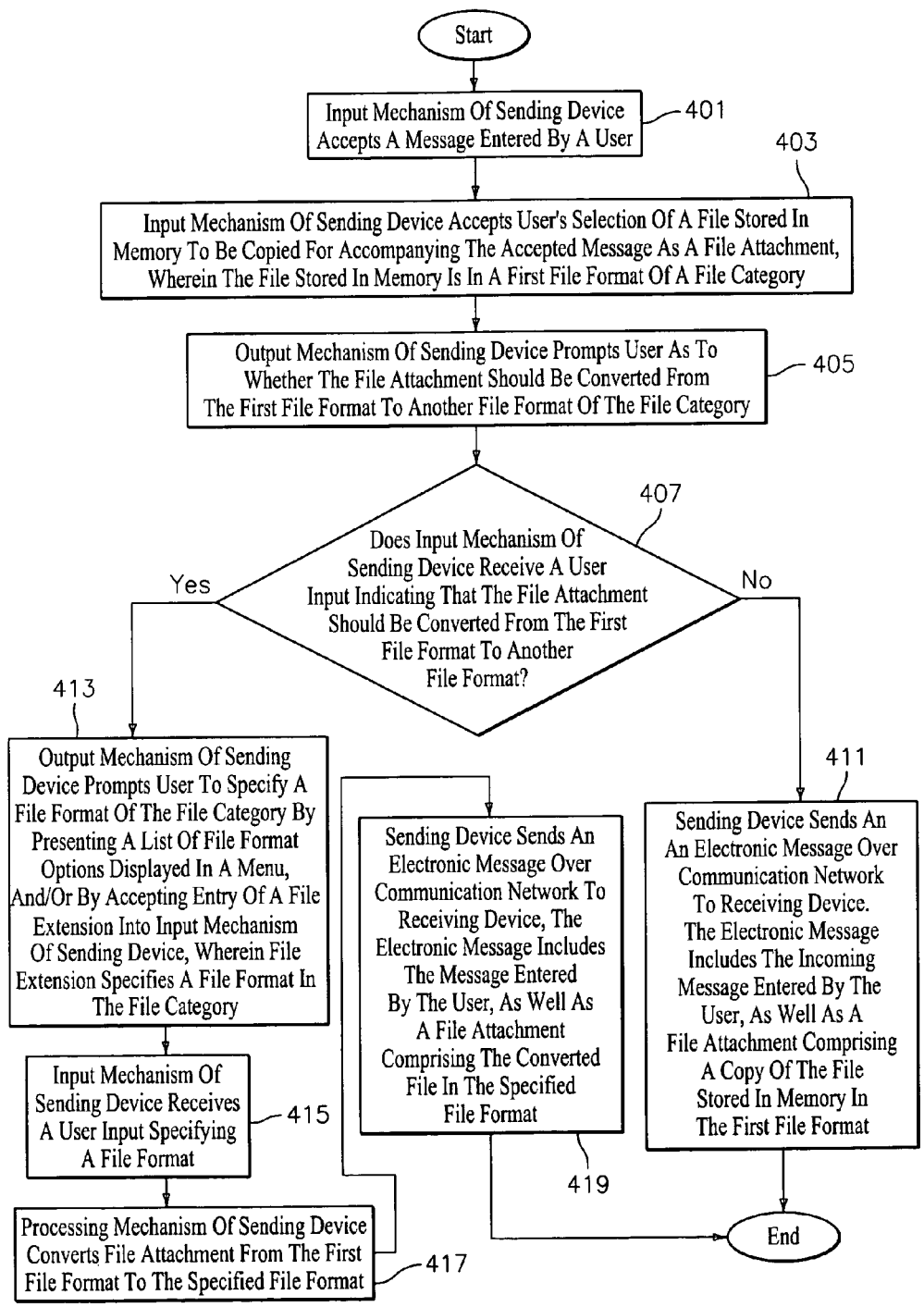
FIG. 4 is a flowchart depicting methods for converting a file attachment to a format specified by a user at a sending device according to an exemplary embodiment.

FIG. 4 is a flowchart depicting methods for converting a file attachment to a format specified by a user at a sending device according to an exemplary embodiment. The procedure commences at block 401 where the input mechanism of the sending device accepts a message entered by a user. The input mechanism of the sending device accepts the user's selection of a file stored in memory to be copied for accompanying the accepted message as a file attachment (block 403). The file stored in memory is in a first file format of a file category. Next (block 405), the output mechanism of the sending device prompts the user as to whether or not the file attachment should be converted from the first file format to another file format of the file category.

At block 407, a test is performed to determine whether or not the input mechanism of the sending device receives a user input indicating that the file attachment should be converted from the first file format to another file format. If so, the program progresses to block 413 where the output mechanism of the sending device prompts the user to specify a file format of the file category by presenting a list of file format options displayed in a menu, and/or by accepting entry of a file extension into the input mechanism of the sending device. The file extension specifies a file format in the file category. Next (block 415), the input mechanism of the sending device receives a user input specifying a file format. The processing mechanism of the sending device converts the file attachment from the first file format to the specified file format (block 417). The sending device sends an electronic message over the communication network to the receiving device. The electronic message includes the message entered by the user, as well as a file attachment comprising the converted file in the specified file format (block 419).

The negative branch from block 407 leads to block 411 where the sending device sends an electronic message over the communication network to the receiving device. The electronic message includes the incoming message entered by the user, as well as a file attachment comprising a copy of the file stored in memory in the first file format.

Figure 5:
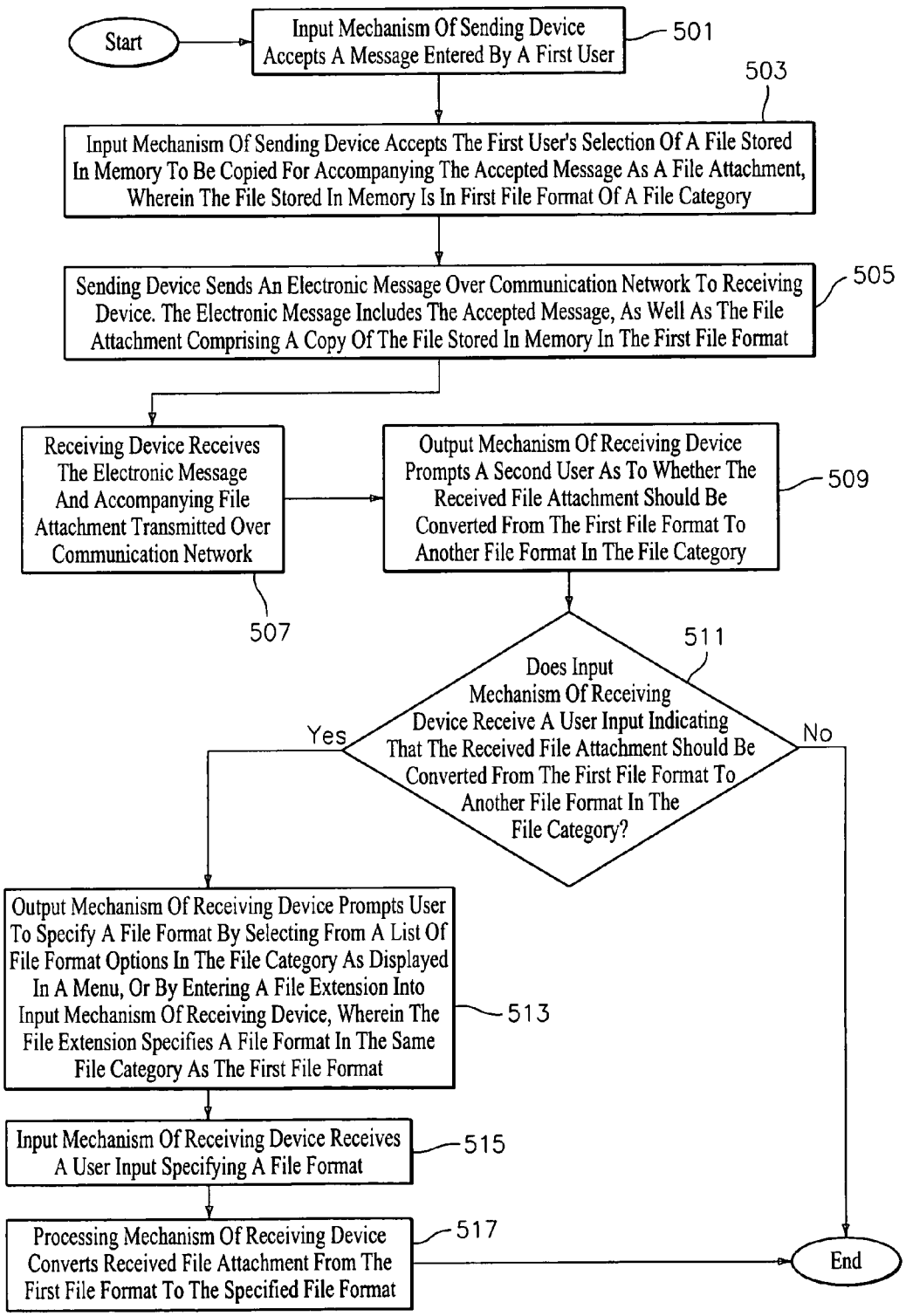
FIG. 5 is a flowchart depicting methods for converting a file attachment to a format specified by a user at a receiving device according to an exemplary embodiment.

FIG. 5 is a flowchart depicting methods for converting a file attachment to a format specified by a user at a receiving device according to an exemplary embodiment. The input mechanism of the sending device accepts a message entered by a first user (block 501). The input mechanism of the sending device accepts the first user's selection of a file stored in memory to be copied for accompanying the accepted message as a file attachment. The file stored in memory is in a first file format of a file category (block 503). The sending device sends an electronic message over the communication network to the receiving device. The electronic message includes the accepted message, as well as a file attachment comprising a copy of the file stored in memory in the first file format (block 505). The receiving device receives the electronic message and the accompanying file attachment transmitted over the communication network (block 507). The output mechanism of the receiving device prompts a second user as to whether the received file attachment should be converted from the first file format to another file format in the file category (block 509).

At block 511, a test is performed to ascertain whether or not the input mechanism of the receiving device receives a user input indicating that the received file attachment should be converted from the first file format to another file format in the file category. If not, the procedure terminates. The affirmative branch from block 511 leads to block 513 where the output mechanism of the receiving device prompts the second user to specify a file format by selecting from a list of file format options in the file category as displayed in a menu, or by entering a file extension into the input mechanism of the receiving device. The file extension specifies a file format in the same file category as the first file format. The input mechanism of the receiving device receives a user input specifying a file format (block 515). The processing mechanism of the receiving device converts the received file attachment from the first file format to the specified file format (block 517).

Figure 6:
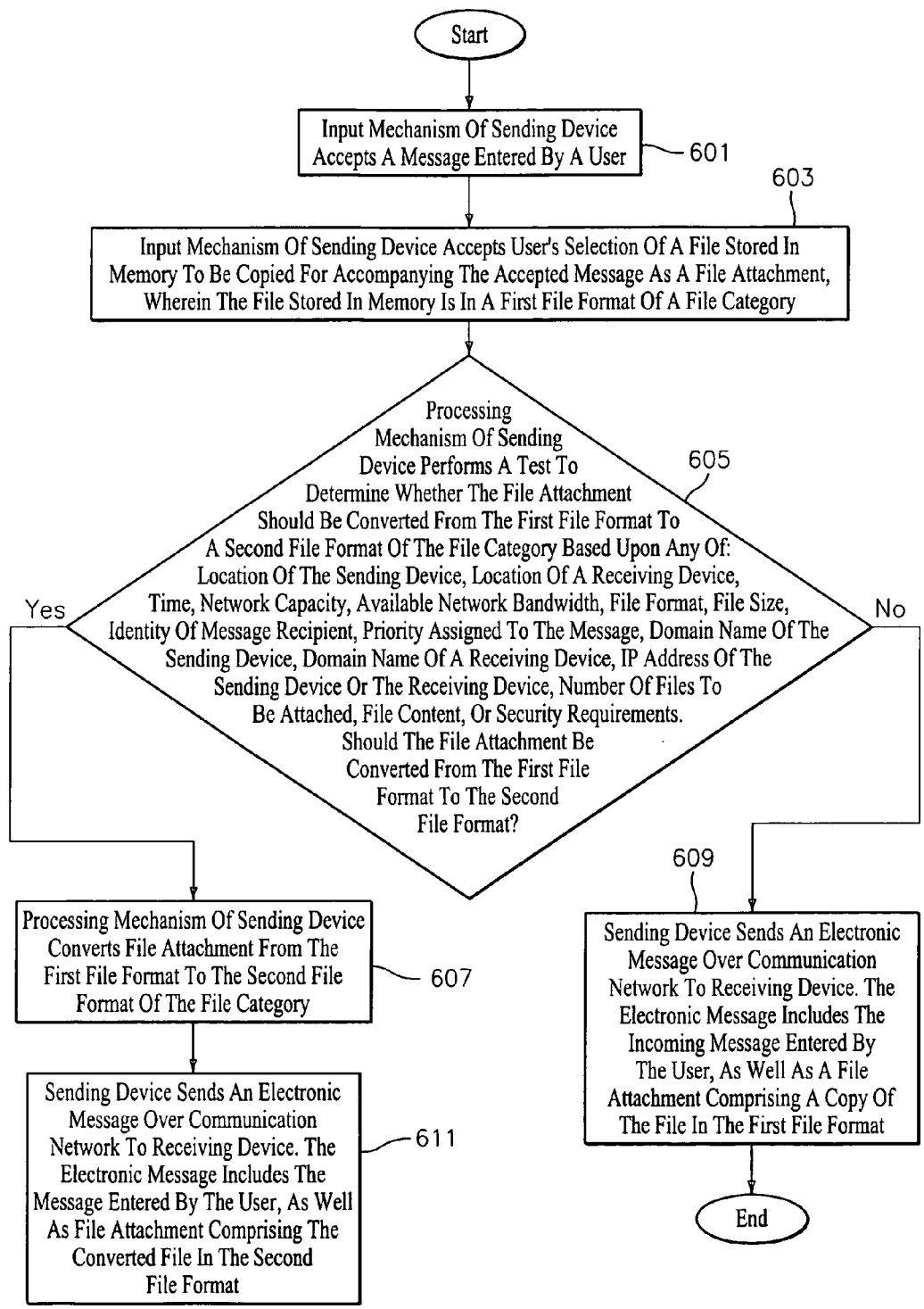
FIG. 6 is a flowchart depicting methods for responding to a triggering event by automatically converting a file attachment from a first file format to a second file format at a sending device according to an exemplary embodiment.

FIG. 6 is a flowchart depicting methods for responding to a triggering event by automatically converting a file attachment from a first file format to a second file format at a sending device according to an exemplary embodiment. The triggering event includes any of: the location of the sending device, the location of the receiving device, time, communication network capacity, available communication network bandwidth, file format, file size, identity of the message recipient, priority assigned to the message, domain name of the sending device, domain name of the receiving device, IP address of the sending device or the receiving device, number of files to be attached, file content, or security requirements. The procedure commences at block 601 where the input mechanism of the sending device accepts a message entered by a user. Next, the input mechanism of the sending device accepts the user's selection of a file stored in memory to be copied for accompanying the accepted message as a file attachment (block 603). The file stored in memory is in a first file format of a file category.

At block 605, the processing mechanism of the sending device performs a test to determine whether or not the file attachment should be converted from the first file format to a second file format of the file category based upon the existence of any of the triggering events referred to in the immediately preceding paragraph. If not, the sending device sends an electronic message over the communication network to the receiving device (block 609). The electronic message includes the incoming message entered by the user, as well as a file attachment comprising a copy of the file in the first file format.

The affirmative branch from block 605 leads to block 607 where the processing mechanism of the sending device converts the file from the first file format to the second file format of the file category. The sending device then sends an electronic message over the communication network to the receiving device (block 611). The electronic message includes the message entered by the user, as well as a file attachment comprising the converted file in the second file format.

Figure 7:
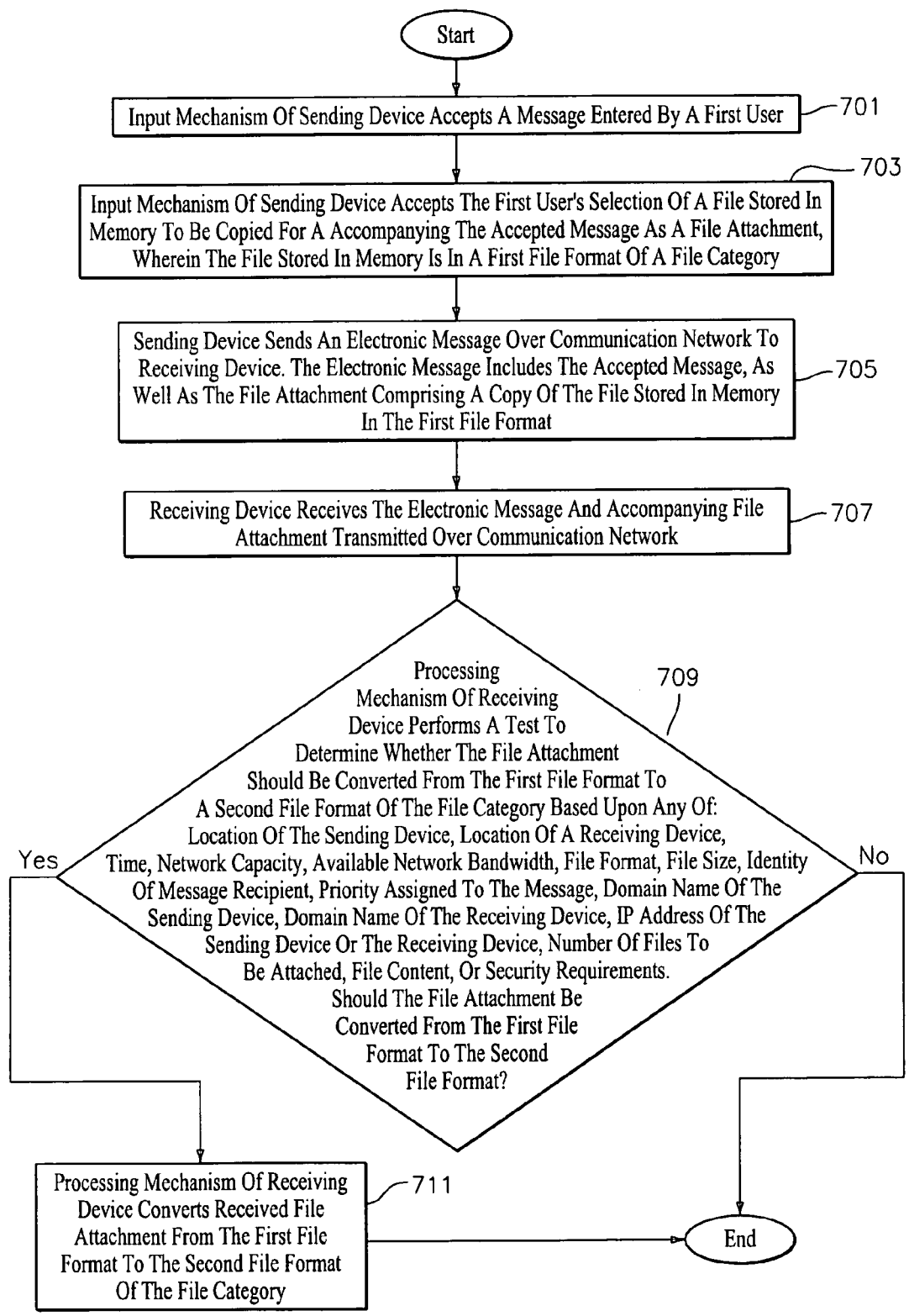
FIG. 7 is a flowchart depicting methods for responding to a triggering event by automatically converting a file attachment from a first file format to a second file format at a receiving device according to an exemplary embodiment.

FIG. 7 is a flowchart depicting methods for responding to a triggering event by automatically converting a file attachment from a first file format to a second file format at a receiving device according to an exemplary embodiment. The triggering event illustratively includes one or more of the events previously mentioned in conjunction with FIG. 6, such as the location of the sending device, the location of the receiving device, time, communication network capacity, available communication network bandwidth, file format, file size, identity of the message recipient, priority assigned to the message, domain name of the sending device, domain name of the receiving device, IP address of the sending device or the receiving device, number of files to be attached, file content, or security requirements.

The procedure of FIG. 7 commences at block 701 where the input mechanism of the sending device accepts a message entered by a first user. The input mechanism of the sending device accepts the first user's selection of a file stored in memory to be copied for accompanying the accepted message as a file attachment (block 703). The file stored in memory is in a first file format of a file category. The sending device sends an electronic message over the communication network to the receiving device (block 705). The electronic message includes the accepted message, as well as a file attachment comprising a copy of the file stored in memory in the first file format. The receiving device receives the electronic message and accompanying file attachment transmitted over the communication network (block 707).

At block 709, the processing mechanism of the receiving device performs a test to determine whether or not the file attachment should be converted from the first file format to a second file format of the file category based upon the existence of any of the triggering events referred to previously in connection with FIG. 6. If not, the procedure terminates. The affirmative branch from block 709 leads to block 711 where the processing mechanism of the receiving device converts the received file attachment from the first file format to the second file format of the file category.

Figure 8:
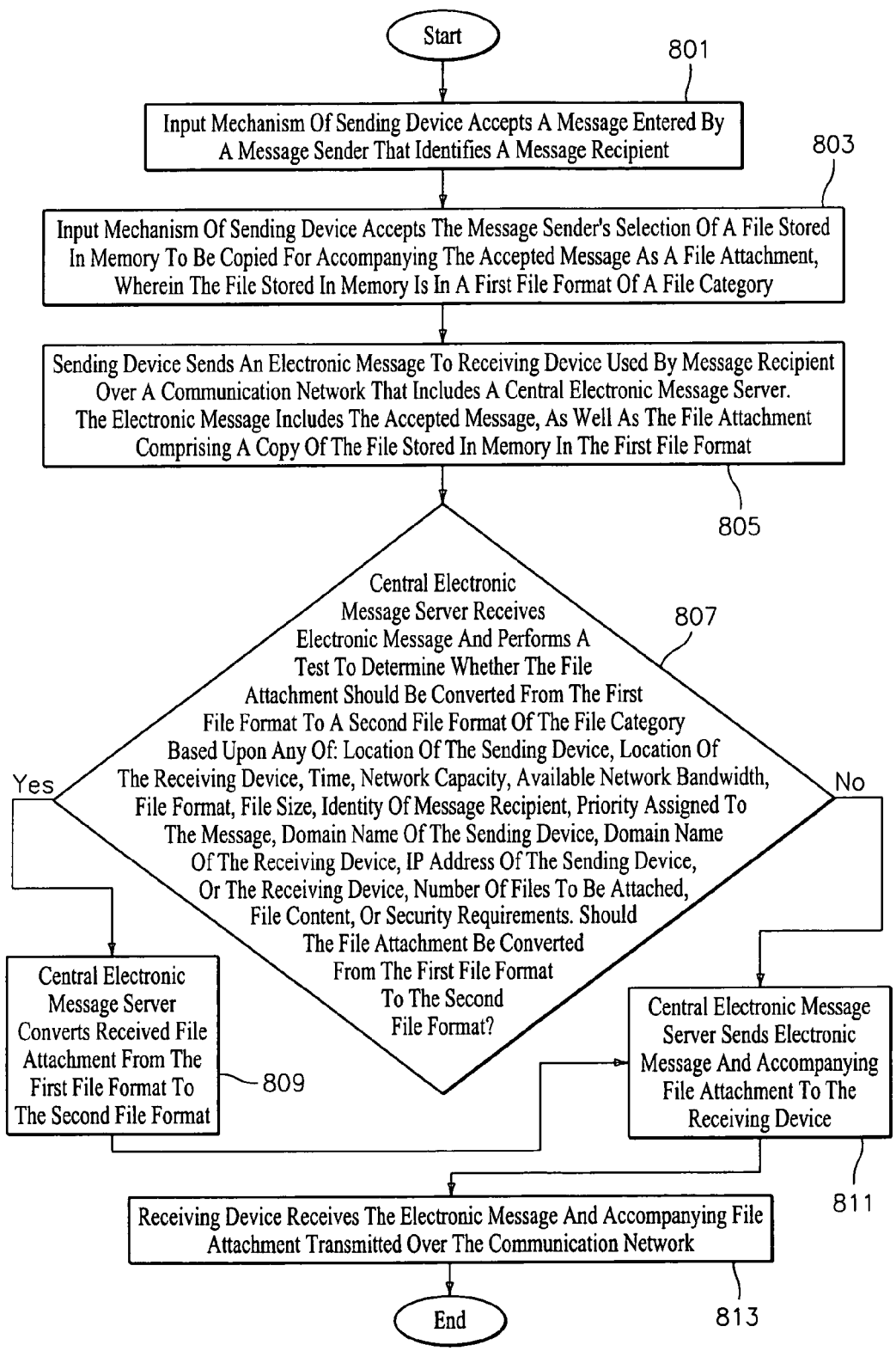
FIG. 8 is a flowchart depicting methods for responding to a triggering event by automatically converting a file attachment from a first file format to a second file format in a communication network according to an exemplary embodiment.

FIG. 8 is a flowchart depicting methods for responding to a triggering event by automatically converting a file attachment from a first file format to a second file format in a communication network according to an exemplary embodiment. The procedure commences at block 801 where the input mechanism of the sending device accepts a message entered by a user. Next, the input mechanism of the sending device accepts the user's selection of a file stored in memory to be copied for accompanying the accepted message as a file attachment (block 803). The file stored in memory is in a first file format of a file category. The sending device sends an electronic message over the communication network to the receiving device used by the message recipient (block 805). The communication network includes a central electronic message server. The electronic message includes the accepted message, as well as a file attachment comprising a copy of the file stored in memory in the first file format.

At block 807, the central electronic message server performs a test to determine whether or not the file attachment should be converted from the first file format to a second file format of the file category based upon the existence of any of the triggering events referred to in the context of FIG. 6. If not, the central electronic message server sends the electronic message and accompanying file attachment to the receiving device (block 811). The receiving device receives the electronic message and accompanying file attachment transmitted over the communication network (block 813).

The affirmative branch from block 807 leads to block 809 where the central electronic message server converts the received file attachment from the first file format to the second file format. The central electronic message server then sends the electronic message and accompanying converted file attachment to the receiving device (block 811). The receiving device receives the electronic message and accompanying converted file attachment transmitted over the communication network (block 813).

Figure 9:
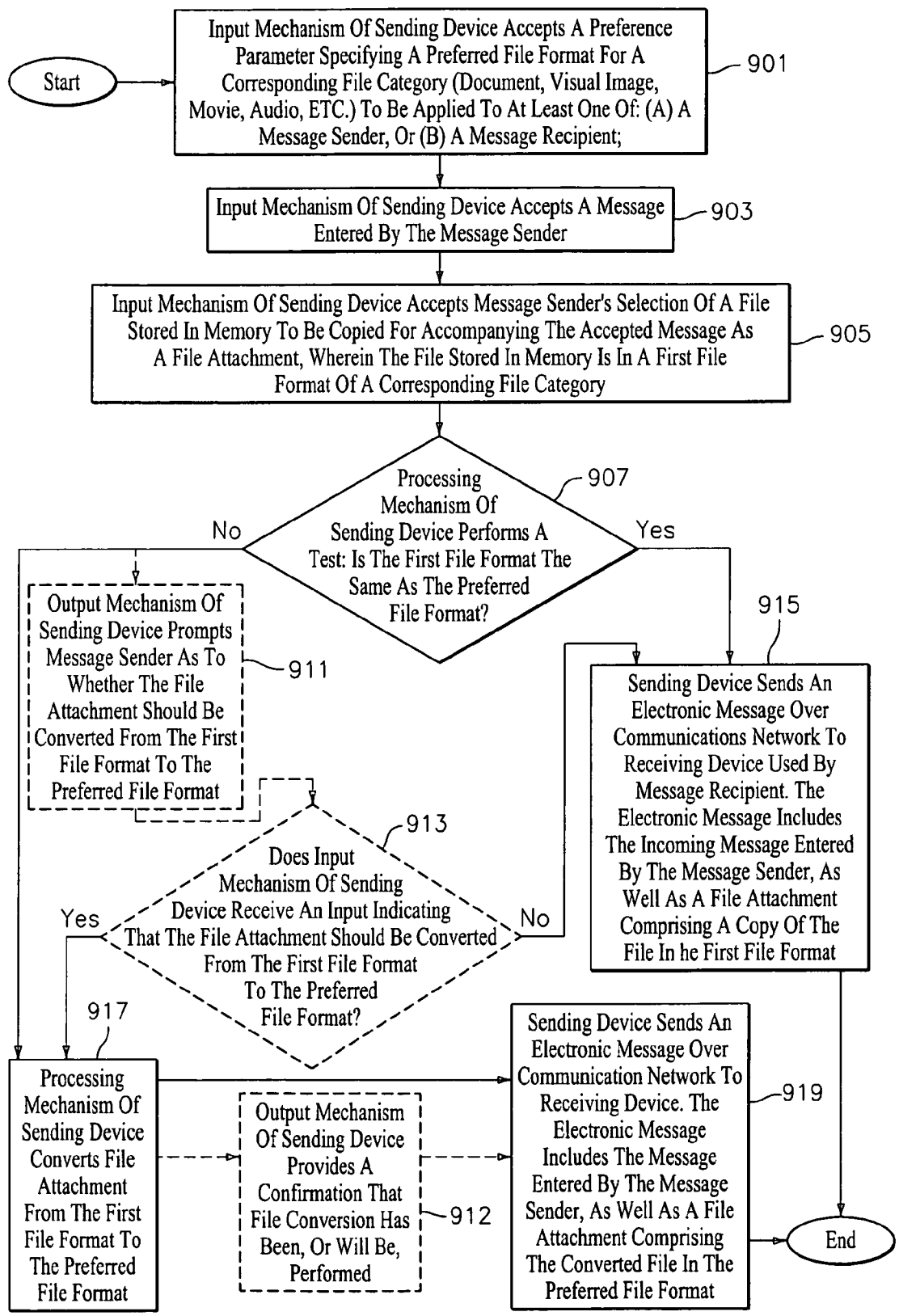
FIG. 9 is a flowchart depicting methods for automatically converting a file attachment to a preferred file format as specified at the sending device according to an exemplary embodiment.

FIG. 9 is a flowchart depicting methods for automatically converting a file attachment to a preferred file format as specified at the sending device according to an exemplary embodiment. The input mechanism of the sending device accepts a preference parameter specifying a preferred file format for a corresponding file category (i.e., document, visual image, movie, audio, etc.) to be applied to at least one of: (a) a message sender, or (b) a message recipient (block 901). The input mechanism of the sending device accepts a message entered by the message sender (block 903). The input mechanism of the sending device accepts the message sender's selection of a file stored in memory to be copied for accompanying the accepted message as a file attachment (block 905). The file stored in memory is in a first file format of a corresponding file category.

At block 907, the processing mechanism of the sending device performs a test to ascertain whether or not the first file format is the same as the preferred file format. If so, the sending device sends an electronic message over the communication network to the receiving device used by the message recipient (block 915). The electronic message includes the incoming message entered by the message sender, as well as a file attachment comprising a copy of the file in the first file format.

The negative branch from block 907 leads to block 917 where the processing mechanism of the sending device converts the file attachment from the first file format to the preferred file format. Optionally, the negative branch from block 907 leads instead to block 911 where the output mechanism of the sending device prompts the message sender as to whether the file attachment should be converted from the first file format to the preferred file format. At optional block 913, a test is performed as to whether or not the input mechanism of the sending device receives an input indicating that the file attachment should be converted from the first file format to the preferred file format. The negative branch from block 913 leads to block 915, described above. The affirmative branch from block 913 leads t block 917, also described above.

After the operations of block 917 are performed, optionally the output mechanism of the sending device will provide a confirmation that file conversion has been, or will be, performed (block 921). The procedure then progresses to block 919 where the sending device sends an electronic message over the communication network to the receiving device. The electronic message includes the message entered by the message sender, as well as a file attachment comprising the converted file in the preferred file format.

Figure 10:
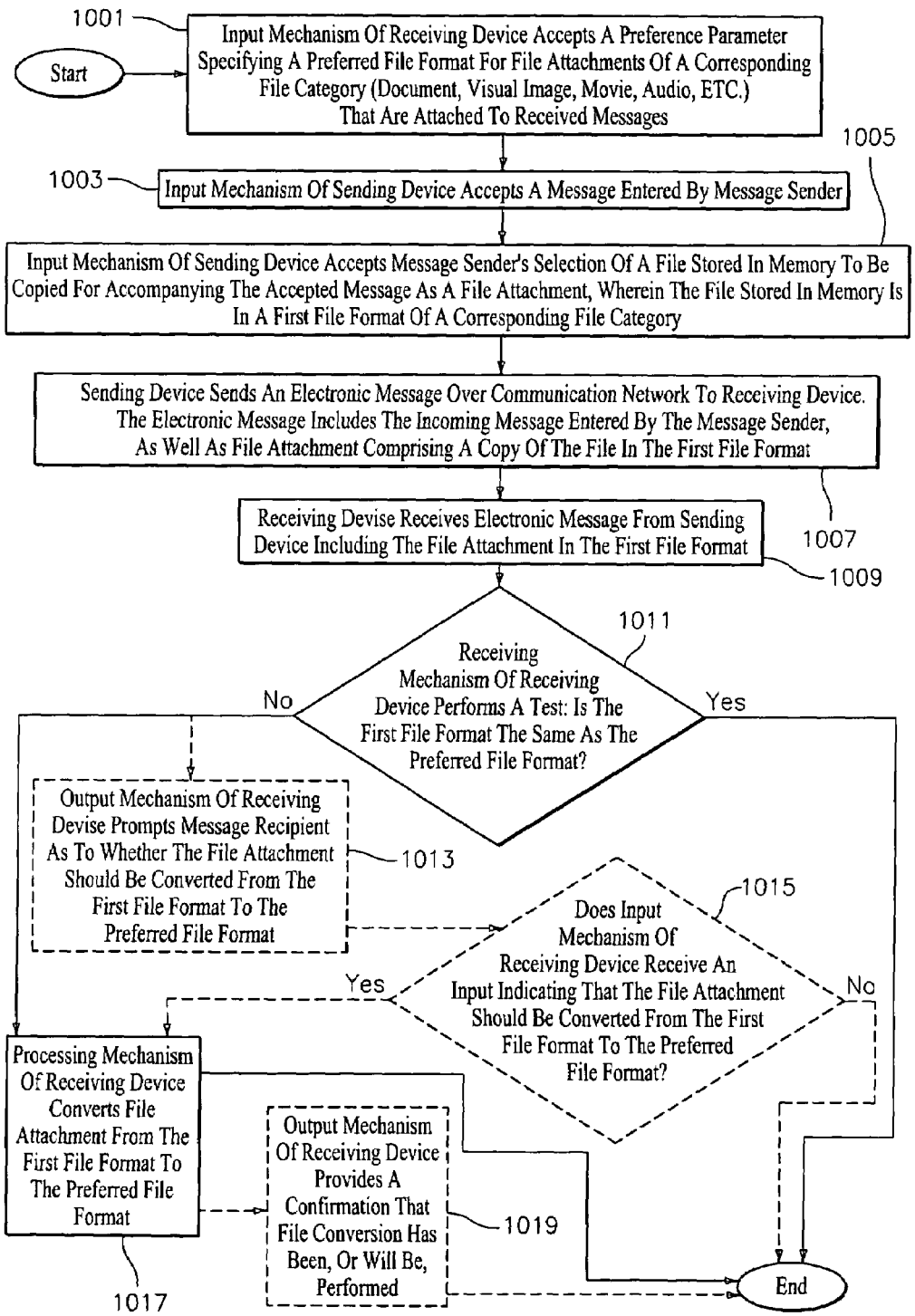
FIG. 10 is a flowchart depicting methods for automatically converting a file attachment to a preferred file format as specified at the receiving device according to an exemplary embodiment.

FIG. 10 is a flowchart depicting methods for automatically converting a file attachment to a preferred file format as specified at the receiving device according to an exemplary embodiment. The input mechanism of the receiving device accepts a preference parameter specifying a preferred file format for file attachments of a corresponding file category (i.e., document, visual image, movie, audio, etc.) that are attached to received messages (block 1001). The input mechanism of the sending device accepts a message entered by a message sender (block 1003). The input mechanism of the sending device accepts the message sender's selection of a file stored in memory to be copied for accompanying the accepted message as a file attachment (block 1005). The file stored in memory is in a first file format of a corresponding file category. The sending device sends an electronic message over the communication network to the receiving device (block 1007). The electronic message includes the incoming message entered by the message sender, as well as a file attachment comprising a copy of the file in the first file format. The receiving device receives the electronic message from the sending device (block 1009). The electronic message includes the file attachment in the first file format.

At block 1011, the processing mechanism of the receiving device performs a test to ascertain whether or not the first file format is the same as the preferred file format. If so, the program terminates. The negative branch from block 1011 leads to block 1017 or optional block 1013. At block 1017, the processing mechanism of the receiving device converts the file attachment from the first file format to the preferred file format. At optional block 1013, the output mechanism of the receiving device prompts the message recipient as to whether the file attachment should be converted from the first file format to the preferred file format. Next, at optional block 1015, a test is performed to ascertain whether the input mechanism of the receiving device receives an input indicating that the file attachment should be converted from the first file format to the preferred file format. If not, the procedure terminates. The affirmative branch from block 1015 leads to block 1017, discussed above. After the operation of block 1017 is performed, optional block 1019 may, but need not, be performed. At block 1019, the output mechanism of the receiving device provides a confirmation that file conversion has been, or will be, performed.

Figure 11A:
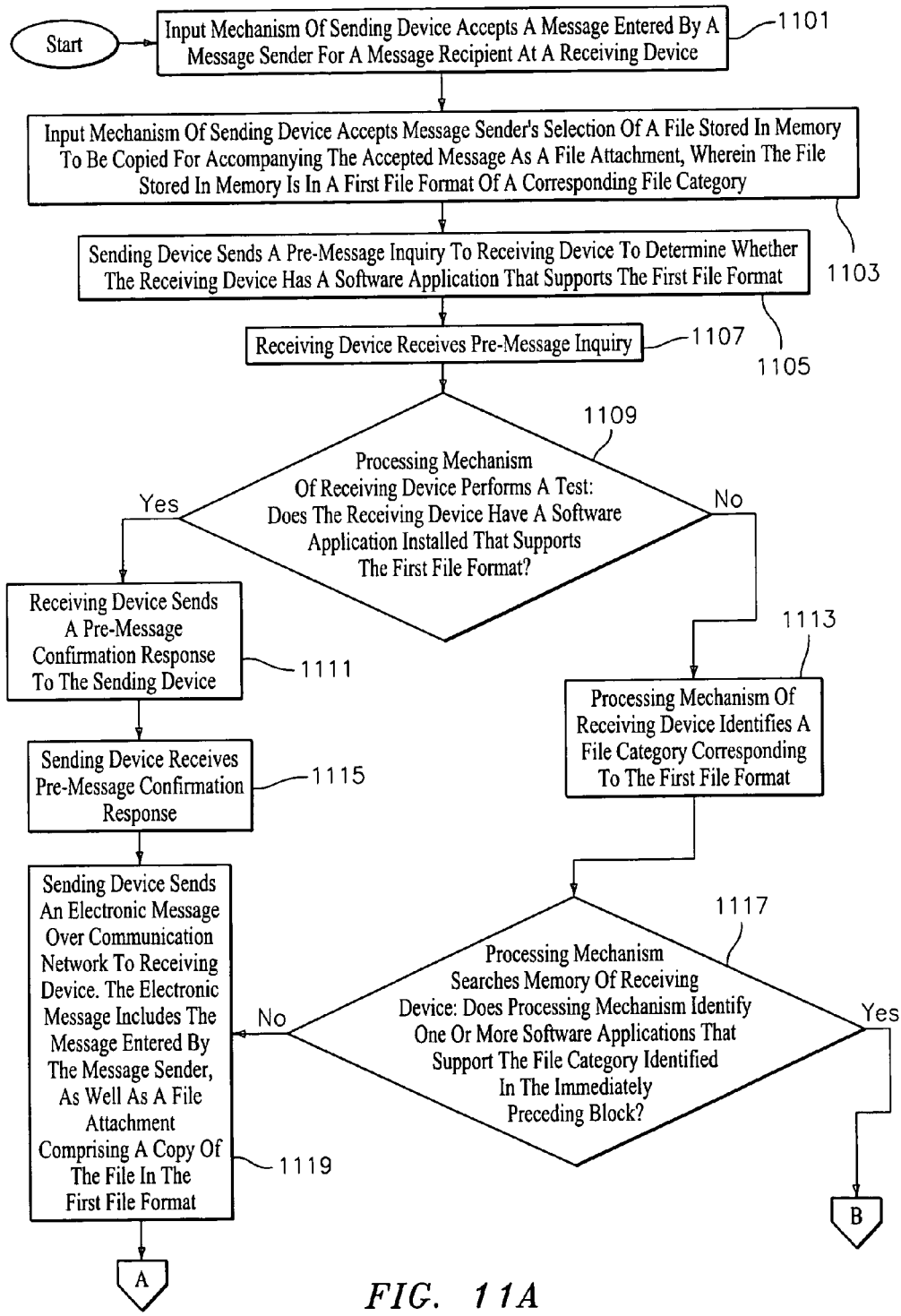
FIGS. 11A and 11B together comprise a flowchart depicting methods for converting a file attachment to an appropriate file format based upon software capabilities at a receiving device according to an exemplary embodiment.
Figure 11B:
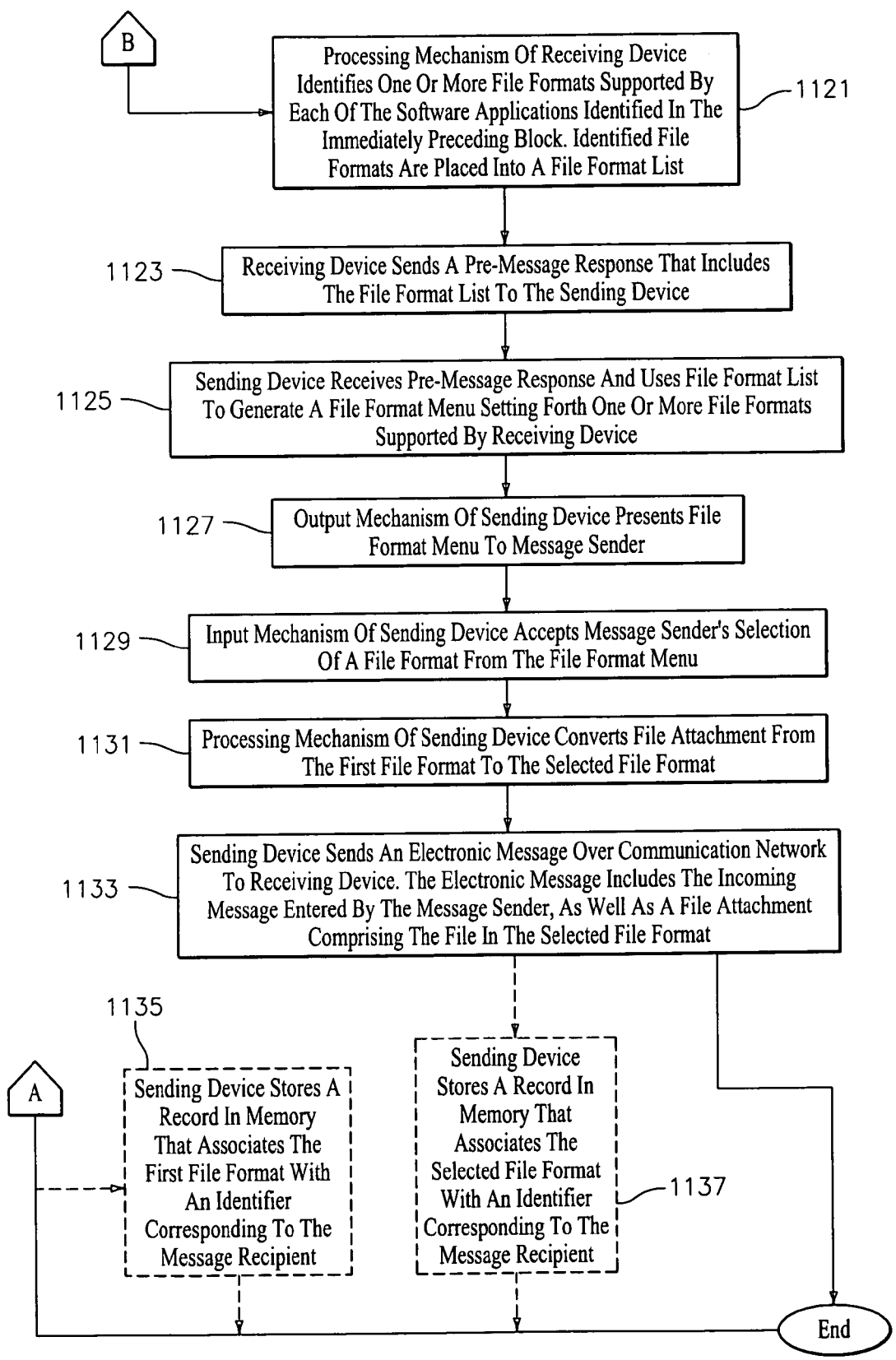

FIGS. 11A and 11B together comprise a flowchart depicting forth methods for converting a file attachment to an appropriate file format based upon software capabilities at a receiving device according to an exemplary embodiment. The input mechanism of the sending device accepts a message entered by a message sender for a message recipient at a receiving device (block 1101). The input mechanism of the sending device accepts the message sender's selection of a file stored in memory to be copied for accompanying the accepted message as a file attachment (block 1103). The file stored in memory is in a first file format of a corresponding file category. The sending device sends a pre-message inquiry to the receiving device to ascertain whether or not the receiving device has a software application that supports the first file format (block 1105). The receiving device receives the pre-message inquiry (block 1107).

The processing mechanism of the receiving device performs a test at block 1109 to ascertain whether or not the receiving device has a software application installed that supports the first file format. If so, the receiving device sends a pre-message confirmation response to the sending device (block 1111). The sending device receives the pre-message confirmation response (block 1115). The sending device sends an electronic message over the communication network to the receiving device. The electronic message includes the message entered by the message sender, as well as a file attachment comprising a copy of the file in the first file format (block 1119). At optional block 1135, the sending device may store a record in memory that associates the first file format with an identifier corresponding to the message recipient.

The negative branch from block 1109 leads to block 1113 where the processing mechanism of the receiving device identifies a file category corresponding to the first file format. At block 1117, the processing mechanism of the receiving device searches the receiving device memory in an attempt to identify one or more software applications that support the file category identified in block 1113. If the processing mechanism fails to identify any software application that supports the identified file category, program control advances to block 1119 (discussed above).

The affirmative branch from block 1117 leads to block 1121 where the processing mechanism of the receiving device identifies one or more file formats supported by each of the software applications identified in the immediately preceding block. The identified formats are placed on a file format list. The receiving device sends a pre-message response to the sending device (block 1123). The pre-message response includes the file format list. The sending device receives the pre-message response and uses the file format list to generate a file format menu setting forth one or more file formats supported by the receiving device (block 1125). The output mechanism of the sending device presents the file format menu to the message sender (block 1127). The input mechanism of the sending device accepts the message sender's selection of a file format from the file format menu (block 1129). The processing mechanism of the sending device converts the file attachment from the first file format to the selected file format (block 1131). The sending device sends an electronic message over the communication network to the receiving device. The electronic message includes the incoming message entered by the message sender, as well as a file attachment comprising the file in the selected file format (block 1133). Optionally, the sending device stores a record in memory that associates the selected file format with an identifier corresponding to the message recipient (block 1137).

Figure 12A:
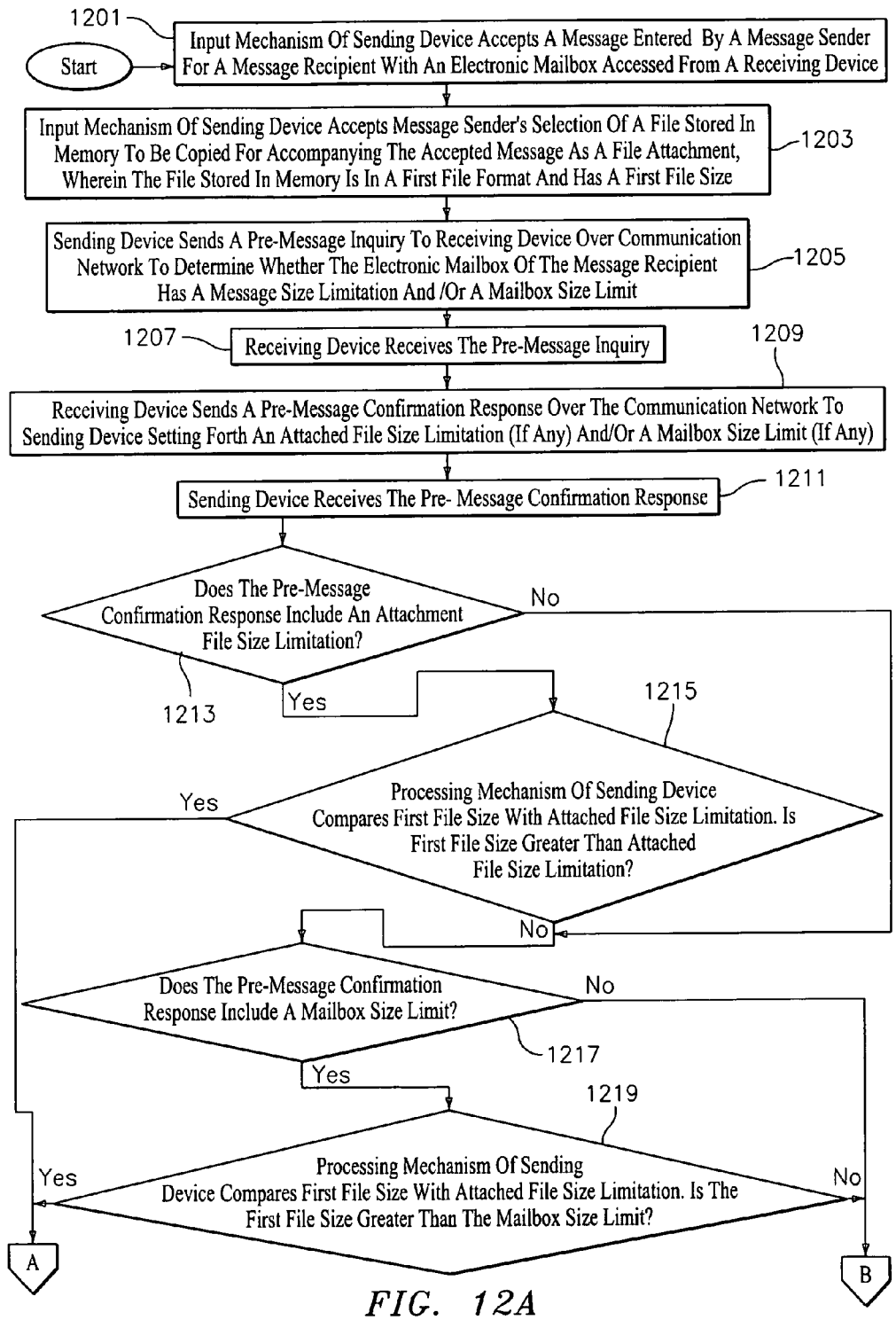
FIGS. 12A and 12B together comprise a flowchart depicting methods for converting a file attachment to an appropriate file format based upon electronic mailbox size limitations or attached file size limitations applicable to a recipient's incoming email according to an exemplary embodiment.
Figure 12B:
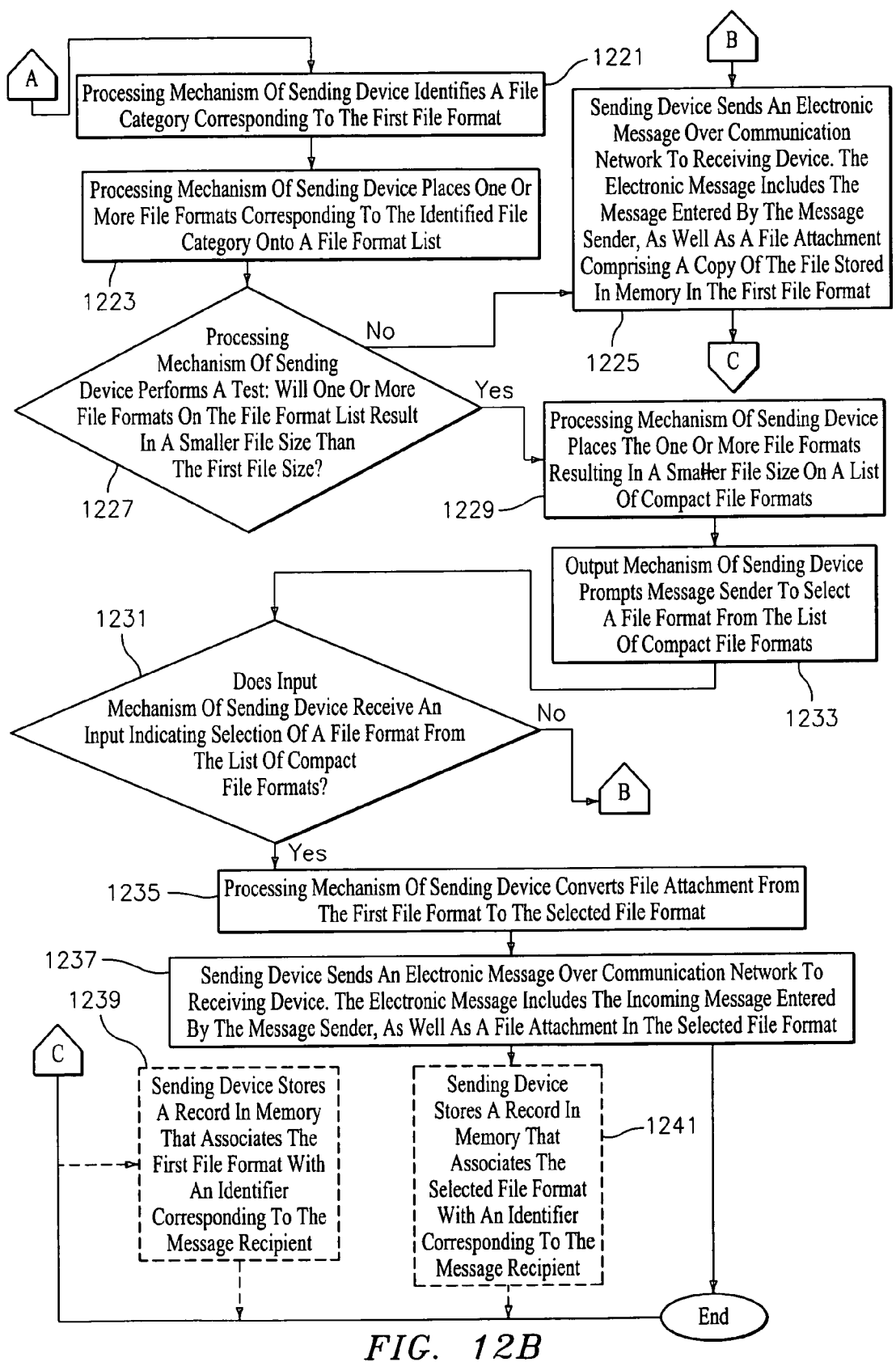

FIGS. 12A and 12B together comprise a flowchart depicting methods for converting a file attachment to an appropriate file format based upon electronic mailbox size limitations or attached file size limitations applicable to a recipient's incoming email according to an exemplary embodiment. The input mechanism of the sending device accepts a message entered by a message sender for a message recipient with an electronic mailbox accessed from a receiving device (block 1201). The input mechanism of the sending device accepts the message sender's selection of a file stored in memory to be copied for accompanying the accepted message as a file attachment. The file stored in memory is in a first file format and has a first file size (block 1203). The sending device sends a pre-message inquiry to the receiving device over the communication network to determine whether the electronic mailbox of the message recipient has a message size limitation and/or a mailbox size limit (block 1205). The receiving device receives the pre-message inquiry (block 1207). The receiving device sends a pre-message confirmation response over the communication network to the sending device setting forth an attached file size limitation (if any) and/or a mailbox size limit (if any) (block 1209). The sending device receives the pre-message confirmation response (block 1211).

At block 1213, a test is performed to ascertain whether the pre-confirmation response includes an attached file size limitation. If so, the program advances to block 1215 where the processing mechanism of the sending device compares the first file size with the attached file size limitation to determine whether or not the first file size is greater than the attached file size limitation. If not, program control progresses to block 1217 where a test is performed to ascertain whether or not the pre-message confirmation response includes a mailbox size limit. If so, the processing mechanism of the sending device compares the first file size with the attached file size limitation to determine whether or not the first file size is greater than the mailbox size limit (block 1219). If not, program control progresses to block 1225 where the sending device sends an electronic message over the communication network to the receiving device. The electronic message includes the message entered by the message sender, as well as a file attachment comprising a copy of the file stored in memory in the first file format. Optionally, at block 1239, the sending device stores a record in memory that associates the first file format with an identifier corresponding to the message recipient.

The negative branch from block 1213 leads to block 1217 (described above). The negative branch from block 1217 leads to block 1225 (described above). The affirmative branch from block 1215 leads to block 1221, and the affirmative branch from block 1219 also leads to block 1221.

At block 1221, the processing mechanism of the sending device identifies a file category corresponding to the first file format. The processing mechanism of the sending device places one or more file formats corresponding to the identified file category onto a file format list (block 1223). At block 1227, the processing mechanism of the sending device performs a test to determine whether or not one or more file formats on the file format list will result in a smaller file size than the first file size. If not, the program advances to block 1225 (described above).

The affirmative branch from block 1227 leads to block 1229 where the processing mechanism of the sending device places the one or more file formats resulting in a smaller file size on a list of compact file formats. The output mechanism of the sending device then prompts the message sender to select a file format from the list of compact file formats (block 1233). At block 1231, a test is performed to determine whether or not the input mechanism of the sending device receives an input indicating selection of a file format from the list of compact file formats. If not, the program advances to block 1225 (described above). The affirmative branch from block 1231 leads to block 1235 where the processing mechanism of the sending device converts the file attachment from the first file format to the selected file format. The sending device sends an electronic message over the communication network to the receiving device. The electronic message includes the incoming message entered by the message sender, as well as a file attachment in the selected file format (block 1237). Optionally (block 1241), the sending device stores a record in memory that associates the selected file format with an identifier corresponding to the message recipient.

Figure 13:
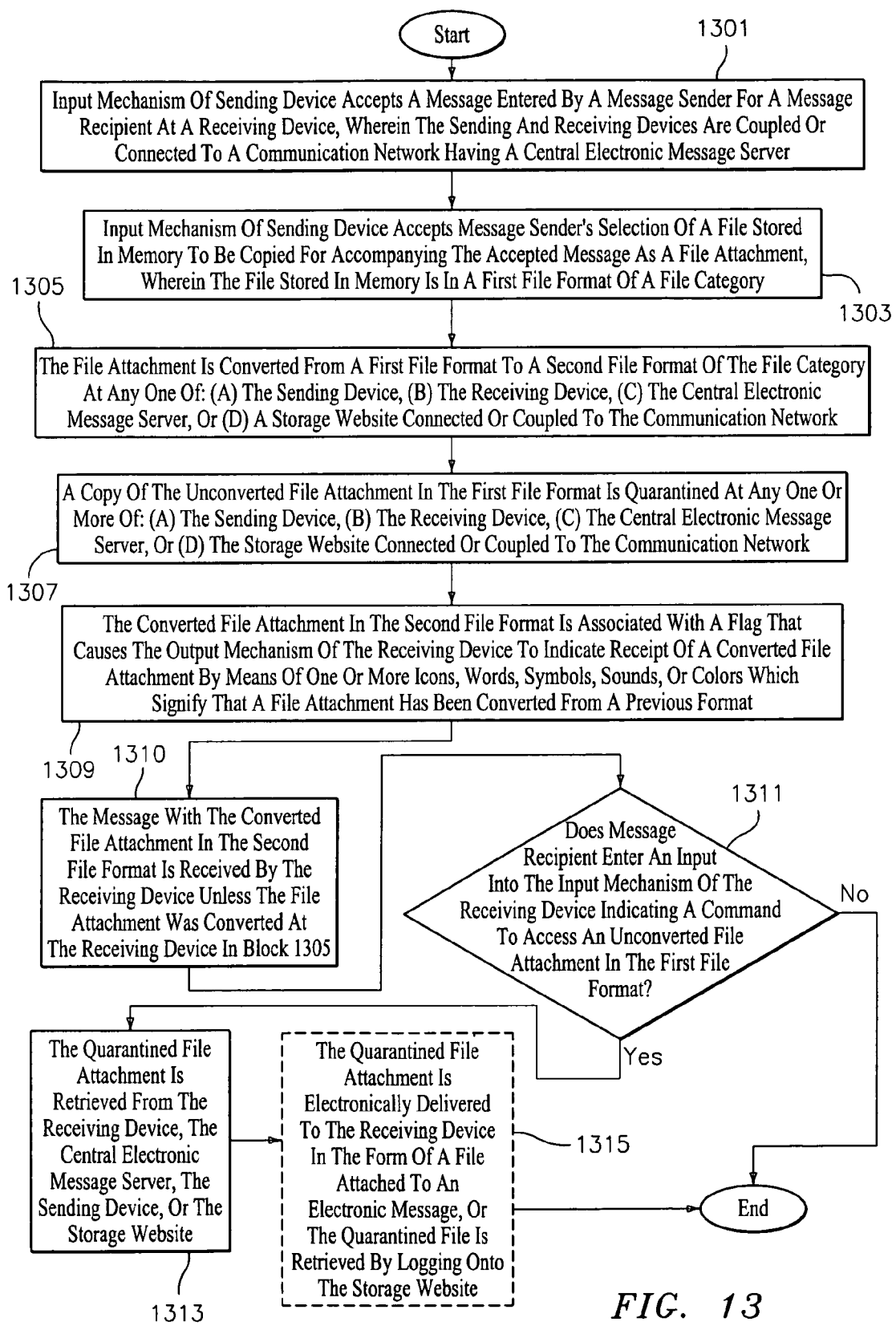
FIG. 13 is a flowchart depicting methods for converting an original file attachment to another file format while storing the original file attachment for subsequent access from a receiving device according to an exemplary embodiment.

FIG. 13 is a flowchart depicting methods for converting an original file attachment to another file format while storing the original file attachment for subsequent access from a receiving device according to an exemplary embodiment. The input mechanism of the sending device accepts a message entered by a message sender for a message recipient at a receiving device (block 1301). The sending and receiving devices are coupled or connected to a communication network having a central electronic message server. The input mechanism of the sending device accepts the message sender's selection of a file stored in memory to be copied for accompanying the accepted message as a file attachment (block 1303). The file stored in memory is in a first file format of a file category. The file attachment is converted from a first file format to a second file format of the file category at any one of: (a) the sending device, (b) the receiving device, (c) the central electronic message server, or (d) a storage website connected or coupled to the communication network (block 1305). A copy of the unconverted file attachment in the first file format is quarantined at any one or more of: (a) the sending device, (b) the receiving device, (c) the central electronic message server, or (d) a storage website connected or coupled to the communication network (block 1307). The converted file attachment in the second file format is associated with a flag that causes the output mechanism of the receiving device to indicate receipt of a converted file attachment by means of one or more words, symbols, sounds, icons, or colors which signify that a file attachment has been converted from a previous format (block 1309). The message, with the converted file attachment in the second file format, is received by the receiving device (block 1310). At block 1311, a test is performed to ascertain whether or not the message recipient enters an input into the input mechanism of the receiving device indicating a command to access an unconverted file attachment in the first file format. If not, the program terminates.

The affirmative branch from block 1311 leads to block 1313 where the quarantined file attachment is retrieved from the receiving device, the central electronic message server, the sending device, or the storage website. Optionally, the quarantined file attachment is electronically delivered to the receiving device in the form of a file attached to an electronic message, or the quarantined file is retrieved by logging onto the storage website (block 1315).

Figure 14:
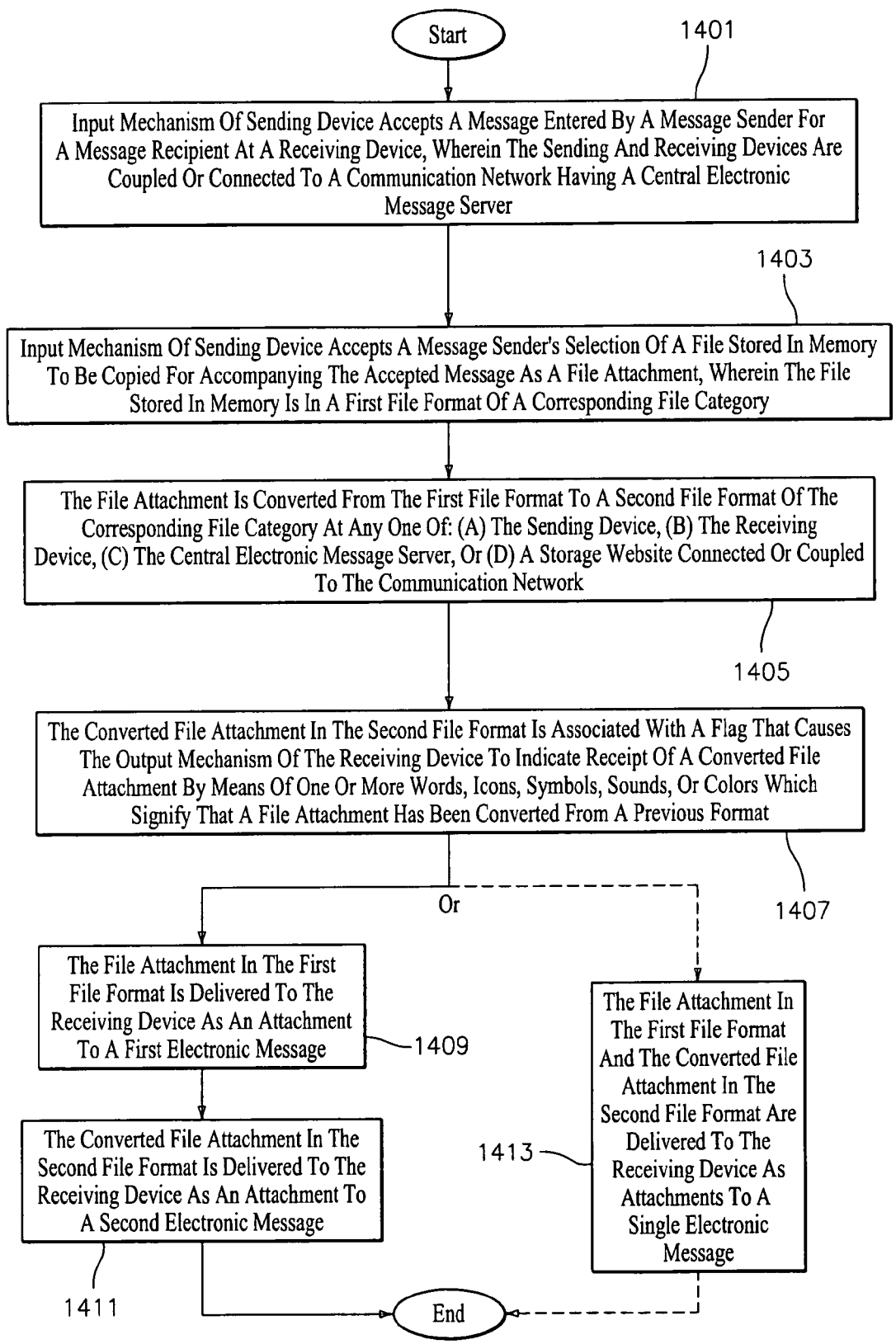
FIG. 14 is a flowchart depicting methods for converting an original file attachment to another file format while providing both the original and converted file attachments to a receiving device according to exemplary embodiment.

FIG. 14 is a flowchart setting forth methods for converting an original file attachment to another file format while providing both the original and converted file attachments to a receiving device according to an exemplary embodiment. The input mechanism of the sending device accepts a message entered by a message sender for a message recipient at a receiving device (block 1401). The sending and receiving devices are coupled or connected to a communication network having a central electronic message server. The input mechanism of the sending device accepts the message sender's selection of a file stored in memory to be copied for accompanying the accepted message as a file attachment (block 1403). The file stored in memory is in a first file format of a corresponding file category. The file attachment is converted from the first file format to a second file format of the corresponding file category at any one of: (a) the sending device, (b) the receiving device, (c) the central electronic message server, or (d) a storage website connected or coupled to the communication network (block 1405).

The converted file attachment in the second file format is associated with a flag that causes the output mechanism of the receiving device to indicate receipt of a converted file attachment by means of one or more symbols, icons, words, sounds, or colors which signify that a file attachment has been converted from a previous format (block 1407). The file attachment in the first file format is delivered to the receiving device as an attachment to a first electronic message (block 1409). The file attachment in the second file format is delivered to the receiving device as an attachment to a second electronic message (block 1411). As an alternate to blocks 1409 and 1411, the file attachment in the first file format and the converted file attachment in the second file format are delivered to the receiving device as attachments to a single electronic message (block 1413).

As described above, exemplary embodiments can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for performing format conversion of a file attached to an electronic message, the method comprising:
   accepting a message entered by a user at a sending device;
   accepting the user's selection of a file to be copied for accompanying the message as a file attachment at the sending device, wherein the file attachment is in a first file format of a file category;
   prompting the user as to whether or not the file attachment should be converted from the first file format to a second file format in the file category, wherein converting the file attachment is not performed unless an input is received from the user indicating that the file attachment should be converted;
   converting the file attachment from the first file format to a second file format of the file category;
   quarantining the file attachment in the first file format;
   transmitting the message entered by the user to a message recipient, wherein the transmitted message is accompanied by the converted file attachment in the second file format of the file category, the converted file attachment in the second file format being associated with a flag indicating that the converted file attachment has been converted from a different format;
   receiving a request from the message recipient for the quarantined file attachment in the first file format; and
   transmitting the file attachment in the first file format to the message recipient in response to the request;
   wherein the second file format is selected based upon at least one of a mailbox size limitation or an attached file size limitation applicable to a message recipient's incoming electronic messages, the sending device sending a pre-message inquiry to the receiving device over the communication network to determine whether the electronic mailbox of the message recipient has a message size limitation and/or a mailbox size limit.

2. An apparatus for performing format conversion of a file attached to an electronic message, the apparatus comprising:
   a memory for storing at least one file in a first file format of a file category;
   an input mechanism capable of accepting a message entered by a user, and capable of accepting the user's selection of a file to be copied from memory for accompanying the message as a file attachment, wherein the file attachment is in a first file format of a file category;
   an output mechanism capable of prompting the user as to whether or not the file attachment should be converted from the first file format to a second file format in the file category, wherein converting the file attachment is not performed unless an input is received at the input mechanism indicating that the file attachment should be converted,
   a processing mechanism for converting the file attachment from the first file format to a second file format of the file category;
   the processing mechanism quarantining the file attachment in the first file format; and a communication mechanism for transmitting the message entered by the user to a message recipient over a communication network, wherein the transmitted message is accompanied by the converted file attachment in the second file format of the file category, the converted file attachment in the second file format being associated with a flag indicating that the converted file attachment has been converted from a different format;
   the processing mechanism receiving a request from the message recipient for the quarantined file attachment in the first file format; and
   the communication mechanism transmitting the file attachment in the first file format to the message recipient in response to the request;
   wherein the communication mechanism is capable of communicating with a receiving device over a communication network, and the processing mechanism is capable of selecting the second file format based upon at least one of: (i) a mailbox size limitation, or (ii) an attached file size limitation, applicable to a message recipient's incoming electronic messages as determined by the communication mechanism engaging in a pre-message communication with the receiving device, the sending device sending a pre-message inquiry to the receiving device over the communication network to determine whether the electronic mailbox of the message recipient has a message size limitation and/or a mailbox size limit.

3. A computer program product for establishing a trusted network, the computer program product comprising:
   a storage medium readable by a processing circuit and storing instructions for execution by the processing circuit for facilitating a method comprising:
   accepting a message entered by a user;
   accepting the user's selection of a file to be copied for accompanying the message as a file attachment, wherein the file attachment is in a first file format of a file category;

prompting the user as to whether or not the file attachment should be converted from the first file format to a second file format in the file category, wherein converting the file attachment is not performed unless an input is received from the user indicating that the file attachment should be converted;

generating a menu of file formats from which a second file format is selected by determining at least one of a mailbox size limitation or an attached file size limitation applicable to a message recipient's incoming electronic messages, a sending device sending a pre-message inquiry to a receiving device over the communication network to determine whether the electronic mailbox of the message recipient has a message size limitation and/or a mailbox size limit:

converting the file attachment from the first file format to the second file format of the file category;

quarantining the file attachment in the first file format;

transmitting the message entered by the user to a message recipient, wherein the transmitted message is accompanied by the converted file attachment in the second file format of the file category, the converted file attachment in the second file format being associated with a flag indicating that the converted file attachment has been converted from a different format;

receiving a request from the message recipient for the quarantined file attachment in the first file format; and transmitting the file attachment in the first file format to the message recipient in response to the request.

* * * * *